(12) United States Patent
Nixon Lane

(10) Patent No.: US 9,245,283 B2
(45) Date of Patent: Jan. 26, 2016

(54) INCENTIVE IMAGING METHODS AND DEVICES

(76) Inventor: Karen Nixon Lane, Plymouth, MI (US)

( * ) Notice: Subject to any disclaimer, the term of this patent is extended or adjusted under 35 U.S.C. 154(b) by 2003 days.

(21) Appl. No.: 11/873,683

(22) Filed: Oct. 17, 2007

(65) Prior Publication Data

US 2008/0103905 A1    May 1, 2008

Related U.S. Application Data

(60) Provisional application No. 60/852,378, filed on Oct. 17, 2006.

(51) Int. Cl.
| | |
|---|---|
| G06Q 30/00 | (2012.01) |
| G06Q 30/02 | (2012.01) |
| G06K 19/077 | (2006.01) |
| G07F 7/10 | (2006.01) |

(52) U.S. Cl.
CPC ...... *G06Q 30/0268* (2013.01); *G06K 19/07703* (2013.01); *G06Q 30/02* (2013.01); *G06Q 30/0212* (2013.01); *G06Q 30/0238* (2013.01); *G06Q 30/0239* (2013.01); *G07F 7/1008* (2013.01)

(58) Field of Classification Search
CPC .................................................. G06Q 30/0268
USPC ....................................................... 705/14.65
See application file for complete search history.

(56) References Cited

U.S. PATENT DOCUMENTS

| | | | |
|---|---|---|---|
| 4,211,668 | A | 7/1980 | Tate |
| 4,419,383 | A | 12/1983 | Lee |
| 5,057,363 | A | 10/1991 | Nakanishi |
| 5,604,027 | A | 2/1997 | Sheridon |
| 5,930,026 | A | 7/1999 | Jacobson et al. |
| 6,068,183 | A | 5/2000 | Freeman et al. |
| 6,631,849 | B2 | 10/2003 | Blossom |
| 6,908,036 | B2 | 6/2005 | Koshimizu et al. |
| 6,924,781 | B1 | 8/2005 | Gelman |
| 7,021,533 | B2 | 4/2006 | Stephenson |
| 7,028,894 | B2 | 4/2006 | Turner et al. |
| 2002/0161640 | A1 | 10/2002 | Wolfe |
| 2003/0011868 | A1 | 1/2003 | Zehner et al. |

(Continued)

FOREIGN PATENT DOCUMENTS

| | | |
|---|---|---|
| EP | 1 643 464 A2 | 4/2006 |
| WO | WO 98/03896 | 1/1998 |
| WO | WO 99/38117 A1 | 7/1999 |

OTHER PUBLICATIONS

European Search Report from corresponding European Application No. 07839624.9 dated Apr. 27, 2011, 7 pages.

*Primary Examiner* — James W Myhre
(74) *Attorney, Agent, or Firm* — Brinks Gilson & Lione

(57) ABSTRACT

A method of providing incentives to customers which involves providing customers with cards having changeable display areas. During a transaction, the cards are received from the customers and an incentive image is displayed on the display areas of the cards when they are returned to the customers. The incentive images can be coupons, discount certificates, or other marketing or promotional offerings, prize notifications, loyalty rewards, etc. The cards can be credit cards, including gift cards, debit cards, ATM cards, shoppers' cards, merchants' cards, phone cards, casino cards, or any other similar cards. A transaction card that displays updated value balances on the card and a system for performing the value updates is also disclosed.

9 Claims, 2 Drawing Sheets

(56) References Cited

U.S. PATENT DOCUMENTS

| | | |
|---|---|---|
| 2004/0239613 A1 | 12/2004 | Kishi |
| 2004/0249631 A1 | 12/2004 | Harris |
| 2004/0249712 A1 | 12/2004 | Brown et al. |
| 2005/0004839 A1 | 1/2005 | Bakker et al. |
| 2005/0134461 A1 | 6/2005 | Gelbman et al. |
| 2005/0139686 A1 | 6/2005 | Helmer et al. |
| 2005/0194454 A1 | 9/2005 | Ferber et al. |
| 2005/0247797 A1 | 11/2005 | Ramachandran |
| 2006/0038022 A1 | 2/2006 | Reid et al. |
| 2006/0065741 A1 | 3/2006 | Vayssiere |
| 2006/0097059 A1 | 5/2006 | Miyazaki |
| 2006/0169787 A1 | 8/2006 | Gelman |
| 2006/0202042 A1 | 9/2006 | Chu |
| 2006/0206376 A1 | 9/2006 | Gibbs et al. |
| 2006/0227097 A1 | 10/2006 | Zhou et al. |

INCENTIVE IMAGING METHODS AND DEVICES

TECHNICAL FIELD

The present invention relates to a method for providing incentives to consumers at transactions and cards that are provided with changeable image displays.

BACKGROUND ART

Conventional point-of-sale computer systems, such as those used in retail stores to record transactions, are being used more and more in customer relationship management systems. The flexibility of the traditional retail applications along with the improving functionality of retail point-of-sale printers has been utilized more and more for purposes of marketing goods and developing customer incentives.

Improves to point-of-sale marketing have typically involved the issuance of promotions, often in the form of coupons, to customers in the checkout lanes. In order to increase the effectiveness of such advertising, systems identify a particular customer through a shopper's club card or other individually distinguishable indicia that is presented to the teller at the time of check out. Once a customer is identified, the system can scan a database of previous purchases made by that customer to identify purchasing habits. Based on these habits, the customer can be issued a coupon, often with the intent of getting the customer to stray from favorite brand names.

Systems such as that described may involve the use of a secondary system with a secondary printer. This secondary system operates independently of the retail system but is capable of accessing data concerning customer transactions. These systems are the subject of much criticism from retailers, however, that are concerned with the secondary hardware and applications that must reside in their stores. Many retailers also object to granting access to data regarding past purchases of their customers. Along these lines, consumers have expressed concern regarding the privacy of their transactions as many consumers feel that prior purchases are personal business and should not be used by a marketing company to derive profit.

An improved system is described in U.S. Pat. No. 7,028,894 to Turner et al. which includes a system and method for targeting marketing messages at a point-of-sale consumer by collecting current transactional receipt data, such as the time of a retail transaction, the date of the transaction, the number of items purchased the transaction, and the total dollar value of a transaction. The data collected from the receipt is then applied to one or more algorithms to determine which marketing messages are most likely to be successful. A predetermined number of marketing messages found most likely to be successful are then printed on the customer receipt in order of priority of expected effectiveness. The system is designed to be used in connection with a point-of-sale terminal without the need for additional hardware, such as a second printer, or the need to access historical customer data.

To date, marketing systems that are designed to provide incentives in the form of coupons, redeemable discounts, etc. all rely on printed materials (e.g., coupons, discount certificates, etc.) which are either printed at the point-of-sale, for example on the back of a cash register receipt, or printed and mailed to customers who participate in customer programs that require the customers to furnish their mailing addresses. Alternatively, some merchants e-mail incentive offerings to registered customers in the form of coupons, redeemable discount certificates that the registered customer prints out on his or her home computer/printer.

The present invention is directed to a promotional/marketing method that images incentives, e.g. coupons, discount certificates, etc. on a credit card, gift card, merchant card, shopper club card, or the like.

DISCLOSURE OF THE INVENTION

According to various features, characteristics and embodiments of the present invention which will become apparent as the description thereof proceeds, the present invention provides a method of providing point-of-sale incentives to customers which involves;

providing a customer with a card having a changeable display area;

receiving the card from the customer during the purchase of a product or service;

causing an image to be displayed on the display area of the card which image comprises an incentive to the customer; and returning the card to the customer with the image displayed thereon.

The present invention further provides a method of providing incentives to customers which involves;

providing a customer with a card having a changeable display area;

receiving the card from the customer during a transaction;

causing an image to be displayed on the display area of the card which image comprises an incentive to the customer; and returning the card to the customer with the image displayed thereon.

The present invention also provides a transaction card that displays an updated display of an image on the card which includes:

a transaction card;

a display area visible on a surface of the transaction card;

a data communications package provided in the transaction card; and a microprocessor for storing a image data and updating and displaying an updated image on the card received from the data communications package.

BRIEF DESCRIPTION OF DRAWINGS

The present invention will be described with reference to the attached drawings which are given as non-limiting examples only, in which.

BEST MODE FOR CARRYING OUT THE INVENTION

The present invention is directed to credit cards, gift cards, merchant cards, shopper club cards, or similar cards that for one reason or another are can be presented at a point-of-sale transaction. More particularly, the present invention is directed to credit cards, gift cards, merchant cards, shopper club cards and the like which are provided with a changeable, renewable or updateable display upon which a incentive such as a coupon, discount certificate, etc. can be displayed.

Figure 1:
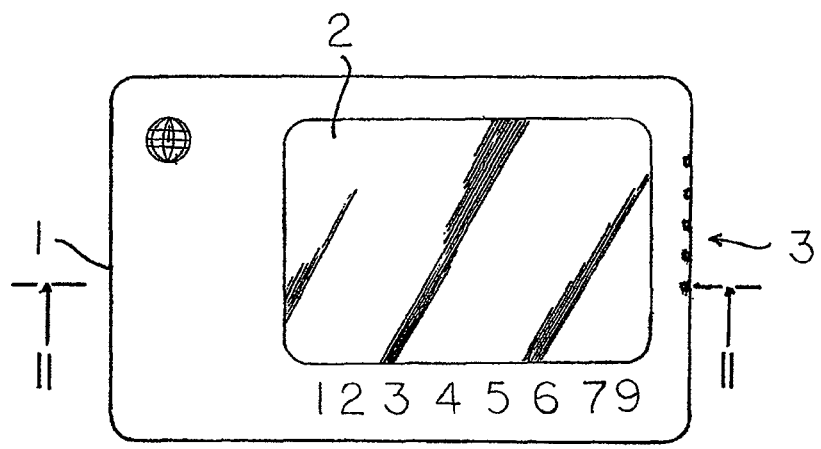
FIG. 1 is an illustration of a credit card according to one embodiment of the present invention.

FIG. 1 is an illustration of a credit card according to one embodiment of the present invention. The credit card shown in FIG. 1 and generally identified by reference numeral 1 can be sized and shaped like a conventional credit card and can include a standard machine-readable magnetic strip and any conventional security protection, e.g. hologram, security code number, owner signature area, photo identification of owner, etc.

Figure 2:
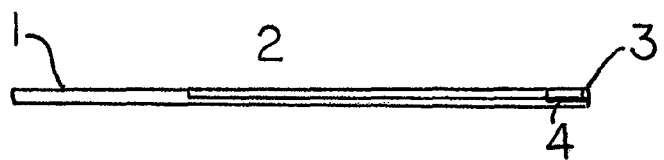
FIG. 2 is a cross-sectional view of the credit card of FIG. 1 taken along sectional lines II-II which illustrates how the leads extend from the display area to contact leads at the edge or peripheral portion of the card according to one embodiment.

According to the present invention, the credit card includes a display area 2 which can extend over any portion of a face of the credit card 1, and is not necessarily limited to the configuration depicted in FIG. 1. The display area 2 comprises an Electronic Paper Display (EPD) that is available from E Ink Corporation and described on E Ink Corporation's website at www.eink.com. The display area 2 can be incorporated into the credit card using any convenient film imaging technique and is provided with an integrated driver lead or bus that is configured to present contact leads at an edge or peripheral portion of the card, generally identified by reference numeral 3 in FIG. 1, for coupling the card to a suitable display driver that can change, renew or update images displayed on the display area. FIG. 2 is a cross-sectional view of the credit card of FIG. 1 taken along sectional lines II-II which illustrates how the leads extend from the display area to contact leads at the edge or peripheral portion of the card according to one embodiment. As shown, leads 4 are embedded in the card 1 and extend from the display area 2 to the contact leads 3.

The use of an EPD eliminates the need for an onboard power supply to view images on the display area 2, since an EPD only requires power to change the image. In such a situation, the necessary power to change the image could be supplied externally though the contact leads. Of course it is within the scope of the invention to provide an onboard power supply, if desired to stabilize the displayed image and to assist in changing, renewing or updating the image.

In an alternative embodiment, the display area 2 could comprise an electronic display that is powered by an onboard power supply. Such electronic displays are known in the art of so-called "smart cards" as offered, for example, by Aveso, Inc. (Fridley, Minn.). Although such electronic displays can be used in the cards of the present invention, their requirement for display power consumption limits useful life and otherwise requires recharging or replacement of their power supplies.

The present invention is further directed to the method using cards, e.g. credit cards, gift cards, merchant cards, shopper club cards, or similar cards having display areas in such a manner that the type of incentives, such as coupons, discount certificates, other offerings, etc. that are conventionally printed on the back or cash register receipts or separately from cash register receipt at a point-of-sale are, according to the present invention, provided as an image that is displayed on the display area of the cards.

Since the image on the display area is changeable, renewable or updateable, it is possible to display a new incentive, e.g. new coupon, new discount certificates, other new offerings, etc., every time the card is presented at a point-of sale transaction. The system used to determine the particular type of incentive, e.g. coupon(s), discount certificate(s), other offering(s), etc. can be essentially the same as those used in known systems which print similar incentives on cash register receipts or secondary point-of-sale printers. Exemplary systems are disclosed or cited in U.S. Pat. No. 7,028,894 to Turner et al., U.S. Pat. No. 6,885,996 to Nicholson, and U.S. Pat. No. 6,321,210 to O'Brien, et al., the complete disclosures of which are hereby expressly incorporated by reference.

According to the present invention, the resulting data that would normally be processed to print a particular incentive is instead used to create an image that is displayed in the display area. Such signal/data processing can be accomplished by known means.

According to an exemplarily scenario a customer having a card according to the present invention goes to a merchant and buys a product or service. Upon presenting his or her credit card to complete the purchase, the customer's card is placed in or ran through a card reader which debits the customer's credit card and a docking port which connects the integrated driver lead or bus at an edge or peripheral portion of the card with a suitable display driver that causes an incentive image to be displayed on the card. According to one embodiment, the displayed image is an incentive that is supplied by a product manufacturer or distributor or other enterprise and is not necessary related to any data related to the customer's shopping habits. In this embodiment, the product manufacturers or distributors or other enterprises can be charged a fee, similar to an advertisement fee, for placing their incentive images on the customer's card. When the customer uses his or her card for a subsequent purchase, the same process is repeated; however, a different incentive image can be displayed on the customer's card. The card reader and docking port can be provided as separate devices or a single integrated device.

According to another embodiment, the card can include any type of information about the customer, such as geographic location, shopping habits, etc., that can be used to determine an appropriate incentive that has a greater potential to induce the customer into purchasing a specific product or service. A specific, non-limiting, example is the type of information that is provided on shoppers' club or merchant's cards, which can be in the formatted as an optical bar code or magnetically encoded. Such data can be read at the time the customer's card is presented to complete a purchase and the algorithms in the above-cited patents or similar algorithms can be used to determine an appropriate incentive image that is displayed on the display area of the card at the point-of-sale.

In a further embodiment of the present invention, in addition to displaying the incentive images discussed above, a random prize notification could be generated and displayed. For example, a sponsor could offer a prize or prizes that would be redeemable if and when a prize notification image would be generated and displayed on the display area of the cards. Such a promotion or random give-a-way would create an additional interest to customers, who in addition to receiving the incentives discussed above, might also be lucky enough to win a prize.

According to another embodiment, the cards having the display areas could be "casino cards" e.g., slot cards, comp cards, players' cards, etc. which, in addition to being used in a conventional manner to reward a customer for his or her loyalty, for example by tracking the amount of money a customer spends and rewarding comps, cash back, etc., can display such rewards, additional incentives, prizes (randomly or drawn), etc.

According to a further embodiment of the present invention, the cards could be provided with a memory chip that would store or stack data related to the last few, for example the last 3 or 4 incentive images, so that a consumer could use an incentive that was previously presented as an image, but subsequently replaced by a later incentive image. Such an embodiment would allow a customer to retain a desired incentive while conducting a point-of-sale transaction that does not utilize the desired incentive, but nevertheless replaces it with a new incentive image. The data stored in the onboard memory chip could be reviewed and verified by a merchant when the card is presented and placed in or ran through an appropriate card reader. When an incentive is used, the onboard memory chip could be updated to delete that incentive.

Although a credit card has been used in the examples presented above, the method of providing incentive images on a card is not limited to the use of credit cards. Other types of cards, including gift cards, debit cards, ATM cards, shoppers' cards, merchants' cards, phone cards, etc. can also be used. Accordingly, the term "card" or "cards" as used herein encompasses all such cards and is not limited to only credit cards. Further, the present invention is not limited for use with rectangular cards, but could also be used in conjunction with keychain-type cards that may or may not be strictly flat or rectangularly shaped, but could have any three-dimensional shape.

Further, reference herein to merchant or merchants includes all types of entities that engage in commercial activity, both wholesale and retail, including manufacturers, distributors or sellers of goods, service industries/entities of all types. Examples include, but are not limited to, department stores, grocery stores, restaurants, banks (AMT's), casinos, etc.

Further, it is noted that while the display area is shown in FIG. 1 as having a rectangular shape, the display area can have any desired shape and can include multiple display areas on one or both sides of the card. Further, in addition to the display areas, any and all the card types discussed herein could include memory chips and function as "smart cards" by storing data thereon and displaying images based upon the stored data, including images that are determined externally from the stored data.

Figure 3:
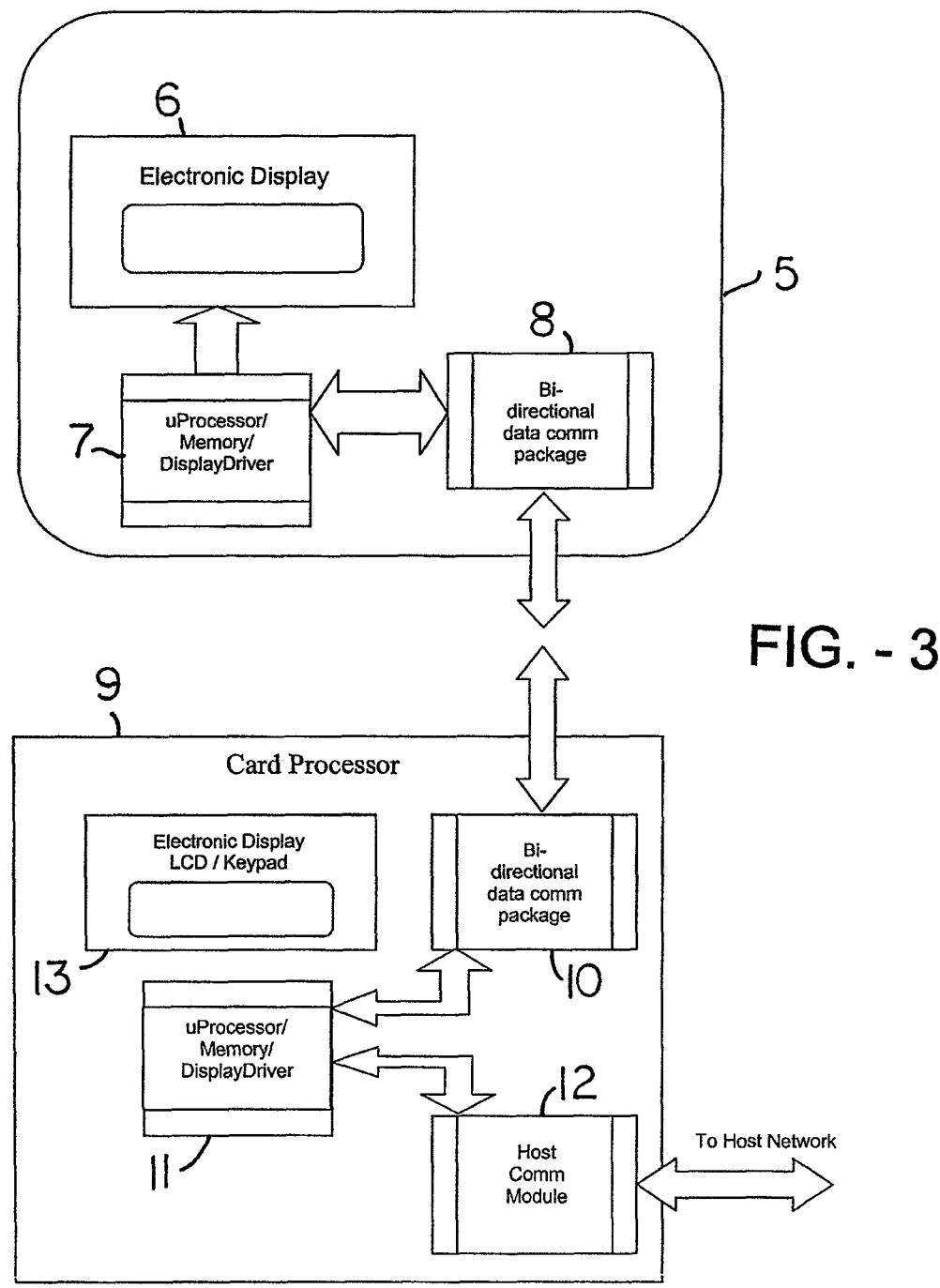
FIG. 3 is a schematic illustration of a transaction card and system for updating and displaying images on the card.

FIG. 3 illustrates another embodiment of the present invention that is directed to a transaction card and system for updating and displaying images on the card.

As used herein, the term "transactional card" refers to credit cards, gift cards, merchant cards, shopper club cards, or similar cards. Such cards are not necessary limited to rectangular cards, but could also be used in conjunction with keychain-type cards that may or may not be strictly flat or rectangularly shaped, but could have any three-dimensional shape.

As depicted in FIG. 3 the transactional card 5 includes a display area 6 which can be similar to the display areas discussed herein in reference to the embodiment of the invention depicted in FIGS. 1 and 2. That is, the display area 6 can be an EPD or an electronic display that is powered by an onboard power supply.

The transactional card and system depicted in FIG. 3 are used to display images on the card before and after a transaction. The images include coupons, discount certificates, or other marketing or promotional offerings, prize notifications, loyalty rewards, etc. The transaction can be any of a commercial activity including a sales transaction, casino gaming activity, cash or value transfer or debit, etc. In this regard, in addition to the display area 6, the transactional card is also provided with a microprocessor 7 that includes a memory for storing image data that has been displayed and/or will be displayed on card 5 and drives the display area 6 to display the current and subsequent images on the card 5. In addition, the transactional card 5 also includes a data communications package 8 that provides communications between the microprocessor 7 onboard the card 5 and a card processor 9, discussed below.

The card processor 9 includes a data communications package 10 that communicates with the onboard data communications package 8. According to one embodiment of the present invention, the data communications packages 8 and 10 communication with a host communication module 12 via processor 11. The host communication module 12 communicates to a host network which, for example can be a merchant's sales transaction network that verifies that the current value or balance of the card 5 is sufficient to complete a desired transaction. The host network debits the transactional card 5 and communicates new image data via the host communications module 12, to the processor 12, which in turn communicates the new image data to the onboard microprocessor 7 via the data communication packages 10 and 8. The display driver of the microprocessor 7 updates the display area 6 to show the new image on the card 5.

The card processor can include an electronic display 13 that functions as a touch keypad to operate the card processor. Alternatively, a separate keypad could be provided.

The transactional card 5 can either include an onboard power source to operate the microprocessor 7 and data communications package 8. Alternatively, the power necessary to operate the microprocessor 7 and data communications package 8 could come from an external source, for example a docking port that is integral or separate from the card processor. As noted above, if an EPD is used, no power will be required to maintain the display of the balance.

The data communication packages can comprise plug-in, docketing type systems or wireless, RF communication chipsets that are packaged appropriately for use in the card format.

The transactional cards can comprise traditional magnetic stripped cards in which instance a reader/transaction processor can be provided that utilizes similar COTS hardware to interface the host system and the transactional cards.

The card processor can also include a physical link and software driven coding/decoding (code) to enable the transfer of appropriate date without host system changes. Typical host network data sources can be TCP/IP over Ethernet or similar, serial or parallel printer data designed to provide customer sales receipts, existing card-swipe terminals, etc.

The transactional card and system depicted in FIG. 3 can use conventional software and hardware that is packaged so as to compatible with the format of a transactional card.

According to another embodiment of the present invention the transactional card and system shown in FIG. 3 can be used to display a current/updated balance on a balance card. As used in reference to this embodiment, a "balance card" includes cards that have a value that changes when the cards are used in a transaction or when the cards are re-charged or re-loaded to increase their value. Non-limiting examples of balance cards include gift cards, credit cards that have a spending limit, re-loadable merchant cards, casino cards, fare cards, etc. Such cards are not necessary limited to rectangular cards, but could also be used in conjunction with keychain-type cards that may or may not be strictly flat or rectangularly shaped, but could have any three-dimensional shape.

In order to update and display the current/updated balance or value of a balance card, the data communication packages 8 and 10 are bi-directional data communications packages.

In operation, the bi-directional data communications package 8 reports an account and/or identification code/number and the current value or balance of the card 5 (if not available to the host network) to the bi-directional data communications package 10. The bi-directional data communications package 10 forwards the account and/or identification code/number and the current value or balance of the card 5 to processor 11 which is in communication with a host communication module 12. The host communication module 12 receives the account and/or identification code/number and the current value or balance of the card 5 and communicates to a host network which, for example can be a merchant's sales transaction network that verifies that the current value or balance of the card 5 is sufficient to complete a desired transaction. The host network debits the balance card 5 (or can re-charge or re-load the balance card 5) and communicates the new balance or value via the host communications module 12, to the processor 12, which in turn communicates the new balance or value to the onboard microprocessor 7 via the bi-directional data communication packages 10 and 8. The display driver of the microprocessor 7 updates the display area 6 to show the new balance or value of the card 5.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

What is claimed is:

1. A method of providing point-of-sale incentives to customers which comprises the steps of:
    a) providing an entity that has a source of a plurality of cards, each card having a changeable electronic paper display area;
    b) distributing at least one of the plurality of cards to a consumer;
    c) having the consumer make at least one transaction with the card, which at least one transaction comprises the purchase of a product or service from a merchant;
    d) coupling the card to an external processor during the at least one transaction which processor supplies power to the electronic paper display area and causes an image to be displayed on the display area of the card which image comprises an incentive to the customer;
    e) returning the card to the customer with the image displayed thereon, and
    f) repeating steps c)-e) a plurality of times
    wherein the images that are displayed on the card in step d) comprise third parties' advertisement information and the third parties pay the entity having the source of a plurality of cards a fee for displaying the image.

2. A method of providing point-of-sale incentives to customers according to claim 1, wherein the images comprise images of a coupon or discount certificate for a subsequent purchase.

3. A method of providing point-of-sale incentives to customers according to claim 1, wherein the images comprise marketing or promotional offerings.

4. A method of providing point-of-sale incentives to customers according to claim 1, wherein the cards comprise one of credit cards, gift cards, debit cards, ATM cards, shopper's club cards, merchant's cards, and phone cards.

5. A method of providing point-of-sale incentives to customers according to claim 1, wherein the cards contain information about the customer which information is processed to determine an appropriate image to be displayed on the card.

6. A method of providing point-of-sale incentives to customers according to claim 1, the images displayed on the cards are changed repeatedly during subsequent transactions.

7. A method of providing point-of-sale incentives to customers according to claim 1, wherein the images comprise notification of a prize that has been won.

8. A method of providing incentives to customers according to claim 1, wherein the cards are casino cards which comprise at least one of a slot card, comp card, or players' card.

9. A method of providing incentives to customers according to claim 1, wherein the entity having the source of a plurality of cards is other than the merchant in step c).

* * * * *